(12) United States Patent
Elst et al.

(10) Patent No.: US 8,067,624 B2
(45) Date of Patent: Nov. 29, 2011

(54) METHOD FOR PRODUCING BIODIESEL USING AN IMMOBILISED CATALYST

(75) Inventors: Kathy Elst, Dessel (BE); Walter Adriansens, Mol (BE); Louis Willems, Dessel (BE); Luc Van Ginneken, Balen (BE)

(73) Assignee: Vlaamse Instelling voor Technologisch Onderzoek N.V. (Vito), Mol (BE)

( * ) Notice: Subject to any disclaimer, the term of this patent is extended or adjusted under 35 U.S.C. 154(b) by 360 days.

(21) Appl. No.: 12/374,644

(22) PCT Filed: Jul. 20, 2007

(86) PCT No.: PCT/EP2007/057528
§ 371 (c)(1),
(2), (4) Date: Jan. 21, 2009

(87) PCT Pub. No.: WO2008/012275
PCT Pub. Date: Jan. 31, 2008

(65) Prior Publication Data
US 2010/0010247 A1    Jan. 14, 2010

(30) Foreign Application Priority Data
Jul. 26, 2006 (EP) .................................. 06117908

(51) Int. Cl.
*C11B 3/00* (2006.01)
(52) U.S. Cl. ....................................................... 554/174
(58) Field of Classification Search .................... 554/174
See application file for complete search history.

(56) References Cited

U.S. PATENT DOCUMENTS

| 2,521,742 | A  | * | 9/1950 | Paterson | 554/167 |
| 5,908,946 | A  | * | 6/1999 | Stern et al. | 554/167 |
| 2002/0035282 | A1 | * | 3/2002 | Suppes | 554/124 |
| 2006/0069274 | A1 | * | 3/2006 | Dias De Moraes E Silva et al. | 554/174 |

FOREIGN PATENT DOCUMENTS

| EP | 0 985 654 A1 | 3/2000 |
| EP | 1 061 120 A1 | 12/2000 |
| EP | 1 126 011 A2 | 8/2001 |
| EP | 1 298 192 A1 | 4/2003 |
| GB | 634411 | * 3/1950 |
| WO | WO 2005/021697 A1 | 3/2005 |

OTHER PUBLICATIONS

Suppes et al., : "Calcium Carbonate Catalyzed Alcoholysis of Fats and Oils" Journal of the American Oil Chemists' Society., vol. 78, No. 2, 2001, pp. 139-1 45.*
Abstr. of JP 2006 03681 7 A , Feb. 9, 2006.*

(Continued)

*Primary Examiner* — Deborah D Carr
(74) *Attorney, Agent, or Firm* — Merchant & Gould P.C.

(57) ABSTRACT

A method produces a fatty acid alkylester by transesterification of a fat or oil and an alcohol. The reaction is catalysed by a heterogeneous catalyst immobilized in a tubular reactor at a temperature between 260 and 420° C. and at a pressure higher than 5 bar. A mixture of the fat or oil and the alcohol is led in a continuous flow through the tubular reactor. The catalyst is preferably a metal oxide or a metal carbonate including an alkaline earth metal. The reaction takes place at reduced residence times and contact times compared to the prior art.

19 Claims, 1 Drawing Sheet

OTHER PUBLICATIONS

Peterson et al., "Rapseed oil transesterification by heterogeneous catalysis," *JAOCS* (1984) 61 (10); 1593-1597. XP002170978.

Gryglewicz, S., "Rapeseed oil methyl esters preparation using heterogeneous catalysts," *Bioresource Technology* (1999) 70; 249-253. XP002456065.

Leclercq et al., "Transesterification of rapeseed oil in the presence of basic zeolites and related solid catalysts," *JAOCS* (2001) 78 (11); 1161-1165. XP001073024.

Corma et al., "Catalysts for the production of fine chemicals," *Journal of Catalysis* (1998) 173; 315-321. XP002456064.

Derwent Publications Ltd., London, GB; AN 2006-130822. XP002415936. JP2006-036817.

Suppes et al., "Calcium carbonate catalyzed alcoholysis of fats and oils," *JAOCS* (2001) 78 (2); 139-145. XP002456063.

Demirbaş, A., "Biodiesel fuels from vegetable oils via catalytic and non-catalytic supercritical alcohol transesterification and other methods: a survey," *Energy Conversion and Management* (2003) 44; 2093-2109. XP004414476.

Cao et al., "Preparation of biodiesel from soybean oil using supercritical methanol and co-solvent," *Fuel* (2005) 84: 347-351.

Demirbaş, A., "Biodiesel from vegetable oils via transesterification in supercritical methanol," *Energy Conversion and Management* (2002) 43: 2349-2356.

Fukuda et al., "Biodiesel fuel production by transesterification of oils," *Journal of Bioscience and Bioengineering* (2001) 92 (5): 405-416.

Kusdiana et al., "Kinetics of transesterification in rapeseed oil to biodiesel fuel as treated in supercritical methanol," *Fuel* (2001) 80: 693-698.

Saka et al., "Biodiesel fuel from rapeseed oil as prepared in supercritical methanol," *Fuel* (2001) 80: 225-231.

Schwab et al., "Preparation and properties of diesel fuels from vegetable oils," *Fuel* (1987) 66: 1372-1378.

Weyten et al., "Biodiesel fuel from vegetable oil by transesterification in supercritical methanol," *Exploratory Workshop on Supercritical Fluids as Active Media: Fundamentals and Applications* (Sep. 20-23, 2001): 177-186.

Weyten et al., "Transesterification reaction of vegetable oil in supercritical methanol," *Proceeding of the 8th Meeting on Supercritical Fluids: Chemical Reactivity and Material Processing in Supercritical Fluids* (Apr. 14-17, 2002): 139-144.

* cited by examiner

METHOD FOR PRODUCING BIODIESEL USING AN IMMOBILISED CATALYST

This application is a National Stage Application of PCT/EP2007/057528, filed Jul. 20, 2007, which claims benefit of Serial No. 06117908.1, filed Jul. 26, 2006 in the EPO and which application(s) are incorporated herein by reference. To the extent appropriate, a claim of priority is made to each of the above disclosed applications.

FIELD OF THE INVENTION

The present invention is related to a process for producing fatty acid alkyl esters through a transesterification of triglyceride contained in a fat and oil by causing the fat and oil and an alcohol to react with each other. The present invention discloses that the transesterification is performed in a tubular reactor containing an immobilized catalyst through which the raw materials are passed to react with each other.

STATE OF THE ART

Because of the world's increasing energy demand and the limited availability of fossil fuels, much research is directed towards development and improvement of alternative renewable fuels. Low-molecular-weight organic liquids can be produced from biomass and can be used or are proposed as fuel for vehicles. The concept of using vegetable oil as a fuel is as old as the combustion engine itself. Rudolf Diesel developed the diesel engine with the full intention of running it on a variety of fuels, including vegetable oil, and even used peanut oil as a fuel to demonstrate his engine at the Paris World exhibition in 1900 (Demirbas, 2002).

There are several ways of using vegetable oils—either virgin or waste—as an alternative fuel. The most promising is believed to be transesterification. The methyl ester of vegetable oil, known as "biodiesel", is very similar to conventional diesel fuel, and can be used in any conventional diesel engine without any modification. The base-catalyzed or acid-catalyzed transesterification of the triglycerides in vegetable oil with a simple alcohol such as methanol to form glycerol and the fatty acid methyl esters (FAMEs) has been the preferred method for a long time (Swab et al., 1987). However, a relatively long reaction time is needed when using either an acidic (1-45 h) or basic (1-8 h) catalyst to form the esters (Saka and Kusdiana, 2001). In addition, for alkali-catalyzed transesterification, the triglycerides and alcohol must be substantially anhydrous because water causes a partial reaction change to saponification, which produces soap. This soap consumes the catalyst and reduces the catalytic efficiency, as well as causing an increase in viscosity and difficulty in achieving separation of glycerol (Fukuda et al., 2001). Also free fatty acids (which are present in commercially available crude oils and fats) are known to react with the alkaline catalyst in the conventional process and form saponified products during the transesterification reactions for biodiesel fuel production. This makes downstream processing (i.e., removal and separation of both the catalyst and the saponified products from the glycerol and the fatty acid methyl esters) quite complex and renders the production of biodiesel quite costly.

To overcome the problems associated with the conventional, acid-catalyzed or base-catalyzed process, different sources suggest to use supercritical alcohols without the use of a catalyst as an alternative reaction medium. A fluid is supercritical if the substance is above both its critical temperature and critical pressure. For instance, European Patent EP 0985654B1 relates to a method for producing fatty acid esters from oil-and-fat and an alcohol by conducting a reaction under such conditions that at least one of the fats and oils and the alcohol is in a supercritical state in the absence of catalyst. The prepared fatty acid esters are useful as fuels such as diesel fuels, lubrication base oils or fuel additives. Saka and Kusdiana (2001) investigated transesterification of rapeseed oil in supercritical methanol in a one-step process without using any catalyst. Experiments were carried out in a batch-type reaction vessel preheated at 350 and 400° C., at a pressure of 45-65 MPa, and with a molar ratio of methanol to rapeseed oil of 42:1. The authors demonstrated that, in a preheating temperature of 350° C. (at a pressure of 45 MPa), 240 s of supercritical treatment of methanol was sufficient to convert the rapeseed oil to methyl esters (>95%) and that the prepared methyl esters were basically the same as those obtained by the conventional method with a basic catalyst. In addition, due to the non-catalytic nature of the supercritical methanol process, the downstream processing of products after the transesterification reaction was found to be much simpler, as compared to the conventional (base-catalyzed) method in which all the catalyst and saponified products have to be removed to obtain biodiesel and glycerol.

The most important variables affecting the fatty acid ester yield during the transesterification reaction in supercritical alcohol are the molar ratio of alcohol to (vegetable) oil, residence time, reaction pressure and reaction temperature. Particularly reaction temperature appears to be a critical variable. Demirbas (2002, 2003) observed that increasing the reaction temperature to supercritical temperatures had a favorable influence on fatty acid ester conversion in a batch system, which is in accordance with the results of Kusdiana and Saka (2001). Since supercritical methanol has a hydrophobic nature and a lower dielectric constant, non-polar triglycerides can be well solvated by supercritical methanol to form a single phase oil/methanol mixture. This phenomenon is likely to promote the transesterification reaction of rapeseed oil. Kinetic modeling indeed showed (Kusdiana and Saka, 2001; Weyten et al., 2001, 2002) that the reaction rate (in methanol) was activated by temperature. The overall reaction was assumed to proceed as a first order reaction as a function of the concentration of triglycerides and reaction temperature. At temperatures below the critical temperature of methanol ($T_c$=239.4° C.), the reaction is limited by the low solubility of the alcohol in the triglycerides. At higher temperatures, these mass transfer limitation are overcome because of the increased solubility and diffusivity of the supercritical fluid. The reaction rate constant increases with about two orders of magnitude. At temperatures above ~300° C. pure reaction kinetics takes over again and it can be assumed that the system is single phase for the methanol-to-oil ratios that were used. This shows the utmost importance of efficient heat transfer to the oil/alcohol reaction mixture during the transesterification reaction so that this reaction mixture reaches a homogeneous (supercritical) state in order to achieve acceptable conversion rates in a short reaction time.

EP 1126011 describes a method in which a solid base catalyst is used in the production of fatty acid esters, at temperatures exceeding 260° C. and in conditions wherein at least the oil or fat or the alcohol is in a supercritical state. In practice, when making biodiesel, the alcohol used is methanol. The critical temperature for methanol is about 240° C., while the critical pressure is about 80.9 bar. Oils or fats have higher critical points, and thus the minimum pressure disclosed in this application is 80.9 bar.

U.S. Pat. No. 5,908,946 discloses a method of production of acid esters from vegetable or animal oils and monoalcohols in the presence of a Zn-based catalyst. The reaction is carried out at a temperature between 170° C. and 250° C. and at a pressure of less than 100 bar.

REFERENCES

Cao, W., Han, H. and Zhang, J. Fuel, 84 (2005) 347.
Demirbas, A. Energy Convers. Manage., 43 (2002) 2349.

Demirbas, A. Energy Convers. Manage., 44 (2003) 2093.
EP 0985654B1. Method for preparing fatty acid esters. Sumitomo Chemical Company, (2004).
EP 1298192B1. Method and apparatus for preparing fatty acid esters. Sumitomo Chemical Company (2005).
EP 1061120A1. Process for preparing alkyl esters of fatty acids from fats and oils. Lonford Development Limited (2000).
Fukuda, H., Kondo, A. and Noda, H. J. Biosci. Bioeng., 92 (2001) 405.
Kusdiana, D. and Saka, S. Fuel, 80 (2001) 693.
Saka, S. and Kusdiana, D. Fuel, 80 (2001) 225.
Schwab, A. W., Bagby, M. O. and Freedman, B., Fuel, 66 (1987) 1372.
Weyten, H., Willems, L., Adriansens, W., Van Ginneken, L. and Devoldere, K. Proc. ESF "Workshop Supercritical Fluids as Active Media: Fundamentals and Applications", Valladolid, 20-22 Sep. 2001, 177.
Weyten, H., Willems, L., Adriansens, W. and Van Ginneken, L. Proc. 8$^{th}$ Meeting "Supercritical Fluids", Bordeaux, 14-17 Apr. 2002, 139.

AIMS OF THE INVENTION

Although the state-of-the-art shows that the supercritical biodiesel production has reaction times of only 4 to 5 minutes, making continuous processing possible, still a high reaction temperature (350° C.), high pressure (at least 80.9 bar) and large excess of MeOH is needed (42:1 mole MeOH/mole oil) to achieve high conversions. It is the aim of this invention to improve the economics of the process, by reducing the reaction temperature and pressure and the excess MeOH, while maintaining the fast reaction rates and a simplified downstream processing.

SUMMARY OF THE INVENTION

The present invention relates to a method for the production of a fatty acid alkylester by transesterification of a fat or oil and an alcohol, wherein the reaction is catalysed by a (heterogeneous) catalyst immobilised in a tubular reactor, temperature is between 260° C. and 420° C., pressure is higher than 5 bar, and a mixture of said fat or oil and said alcohol is led in a continuous flow through said tubular reactor.

Preferably, the alcohol is methanol.

The catalyst preferably comprises (or consists of) a metal oxide. More preferably, the metal oxide comprises an alkaline earth metal. Be, Ca, Mg, Sr, Ba and Ra are alkaline earth metals. Even more preferably, the metal oxide comprises Mg. Alternatively, the metal oxide can comprise Ca.

Preferably, in the method of the invention, the catalyst comprises (or consists of) MgO.

Preferably, the catalyst comprises (or consists of) a metal carbonate. More preferably, the metal carbonate comprises an alkaline earth metal. The alkaline earth metal is preferably Ca.

The catalyst preferably comprises (or consists of) CaCO$_3$.

The catalyst can also be a metal salt. The catalyst can be a zeolite as well.

Advantageously, the catalyst is selected from the group consisting of CaCO3, MgO, γ-Al2O3, Na2CO3, CaO and CaOH.

The catalyst is preferably immobilised in a fixed bed, as a powder, as pellets, as a coating or in a porous structure with a large specific surface. The catalyst can be coated on a carrier.

Preferably, the residence time of the mixture in the tubular reactor falls in the range between 1 minute and 100 minutes.

More preferably, the residence time of the mixture in the tubular reactor falls in the range between 1 minute and 50 minutes.

Preferably, the residence time of the mixture in the tubular reactor falls in the range between 1 minute and 45 minutes. More preferably, the residence time of the mixture in the tubular reactor falls in the range between 5 minutes and 25 minutes.

Preferably, the residence time of the mixture in the tubular reactor falls in the range between 5 minutes and 15 minutes.

Preferably, the contact time of said mixture with said catalyst is lower than 40 minutes and higher than or equal to 1 minute.

Preferably, the contact time of said mixture with said catalyst is lower than 20 minutes and higher than or equal to 1 minute.

Preferably, the contact time of said mixture with said catalyst falls in the range between 2 minutes and 8 minutes, more preferably in the range between 2 minutes and 6 minutes.

In a particular embodiment of the present invention, the pressure is lower than 80.9 bar, i.e. subcritical for methanol.

In an alternative embodiment of the present invention, the pressure is between 5 and 400 bar, preferably between 5 and 150 bar, and more preferably between 40 and 80 bar.

In a preferred embodiment of the invention, the pressure falls in the range between 40 bar and 150 bar.

In the method of the present invention, the ratio of alcohol versus fat or oil is preferably lower than 30 mole/mole. Advantageously, this ratio can be lowered even more to less than 20, or less than 10 mole/mole.

The fat or oil can e.g. be selected from refined or unrefined fat or oil, and refined or unrefined waste fat or oil.

DETAILED DESCRIPTION OF THE INVENTION

Figure 1:
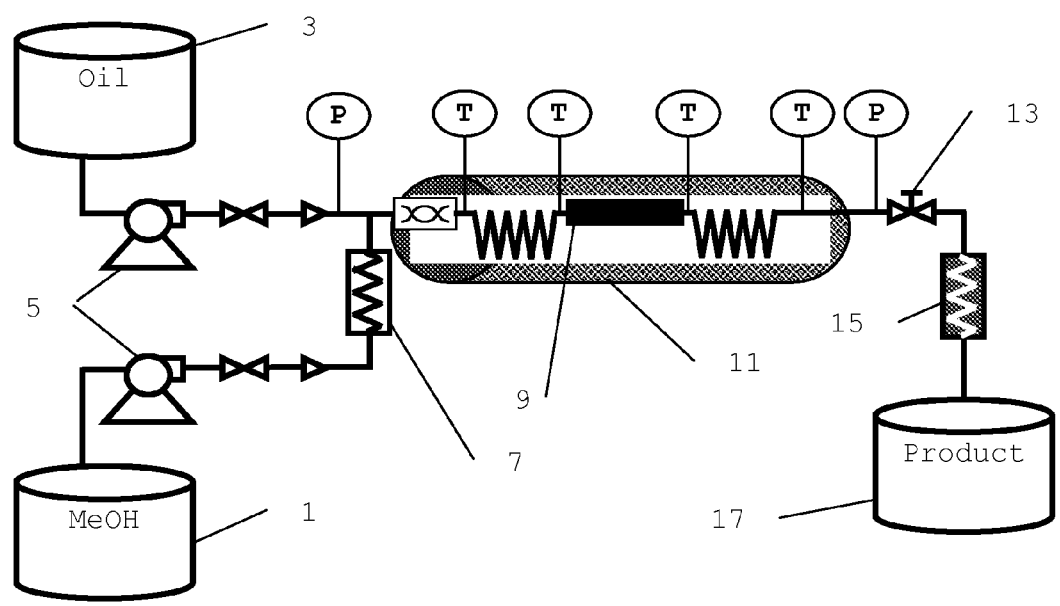
FIG. 1 represents the process according to the present invention.

The aim of the invention is met by processing the oil with MeOH in a continuous tubular reactor containing an immobilized catalyst. The immobilized catalyst can be a metaloxide but is not limited thereto.

Besides methanol (MeOH), other alcohols can be used as well in the method of the invention.

A heterogeneous catalyst refers to a catalyst that constitutes a separate phase (compared to the reactants).

The catalyst materials of the invention can be mixed with each other and/or with other catalysts for use in the method of the invention.

The mixture of fat or oil and alcohol is applied to a reactor at a predetermined flow rate. Said mixture resides in the reactor for a period of time, referred to as the residence time.

EXAMPLES

Effect of Heterogeneous Catalyst

The biodiesel was produced in a tubular reactor. The reactor contained the immobilized heterogeneous catalyst. One way of performing the immobilization is by physically enclosing the catalyst by filters. Of course, other immobilization techniques can be applied as well. The set-up of the process is as follows: oil and alcohol are drawn from resp. reservoirs 3 and 1 using high pressure pumps 5 and brought to the desired pressure. The alcohol is preheated in heater 7. Although not drawn, the oil can be preheated as well. The mixed streams are passed through a tubular reactor 9 containing the immobilised catalyst. The tubular reactor 9 is contained in a furnace or oil bath 11. After the reaction, the pressure is let off at pressure reduction valve 13, the product is cooled (15) and stored (17).

Rapeseed oil and preheated methanol were compressed up to 150 bar and pumped in the tubular reactor. A correct mixing of both reactants was assured in the set-up. The mixed streams were heated up to 300° C. in a furnace or oil bath and brought in contact with the immobilized heterogeneous catalyst. After contact, the resulting stream was cooled, depressurized and collected.

Although most experiments were performed at a pressure of 150 bar, the process is not limited thereto and can be performed at lower as well as at higher pressure. Also the reaction temperature can be enhanced to speed up the reaction times or can be lowered if necessary for the process. Most experiments described herein were performed with rapeseed oil, but other types of oils and fats, waste oil or unrefined oil can be used as well in the process as is demonstrated below. The oil may contain water. Table 1 shows the results of these experiments.

The tubular reactor used for the experiments comprises 3 sections: at the entrance a tubular part without catalyst, a fixed bed which can contain the immobilized (heterogeneous) catalyst and at the end again a tubular part without catalyst.

Comparative Example 1. (C.1)

A first comparative example was made in a tubular reactor without fixed bed. The total volume of the tubular reactor was 20 ml. The methanol and oil were added at a rate ensuring a residence time of 10 minutes and a methanol-to-oil ratio of 0.46 g/g corresponding to a methanol excess of 13 mole/mole.

Comparative Example 2. (C.2)

A similar test was made, but with a residence time of 20 minutes.

Comparative Example 3. (C.3)

Comparative example 3 was made in the same reactor as comparative example 1 and 2. The flow rates of methanol and oil were adjusted to obtain a residence time of 20 minutes and a methanol-to-oil ratio of 0.7 corresponding to a methanol excess of 20.

Comparative Example 4. (C.4)

This comparative example was made in a tubular reactor containing the empty fixed bed. The total empty volume of the reactor was 33 ml. The methanol and oil were added at rates ensuring a residence time of 15 minutes and a methanol-to-oil ratio of 0.6 g/g corresponding to a methanol excess of 17 mole/mole.

Invention Example 1 (I.1)

The fixed bed was filled with CaCO3. The empty volume of the reactor was 25 ml. The flow rates were adjusted to achieve a residence time of 10 minutes and a methanol-to-oil ratio of 0.6 g/g Invention Example 2 (I.2)

The fixed bed was filled with CaCO3. The empty volume of the reactor was 25 ml. The flow rates were adjusted to achieve a residence time of 5 minutes and a methanol-to-oil ratio of 0.6 g/g Invention Example 3 (I.3)

The fixed bed was filled with MgO. The total empty volume of the reactor was 25 ml. The flow rates were adjusted to achieve a residence time of 10 minutes and a methanol-to-oil ratio of 0.6 g/g Invention Example 4 (I.4)

The fixed bed was filled with MgO. The total volume of the reactor was 25 ml. The flow rates were adjusted to achieve a residence time of 5 minutes and a methanol-to-oil ratio of 0.6 g/g Invention Example 5 (I.5)

The fixed bed was filled with γ-Al2O3. The total volume of the reactor was 25 ml. The flow rates were adjusted to achieve a residence time of 15 minutes and a methanol-to-oil ratio of 0.6 g/g The biodiesel content was measured through GC-analysis.

TABLE 1

|  | C.1 | C.2 | C.3 | C.4 | I.1 | I.2 | I.3 | I.4 | I.5 |
|---|---|---|---|---|---|---|---|---|---|
| Conf. | 1 | 1 | 1 | 2 | 3 | 3 | 3 | 3 | 3 |
| Catalyst | — | — | — | — | A | A | B | B | C |
| Temperature |  |  |  |  | 300° C. |  |  |  |  |
| Pressure |  |  |  |  | 150 bar |  |  |  |  |
| MeOH excess (g/g) | 0.46 | 0.46 | 0.7 | 0.6 | 0.6 | 0.6 | 0.6 | 0.6 | 0.6 |
| Residence time (min) | 10 | 20 | 20 | 15 | 10 | 5 | 10 | 5 | 15 |
| Conversion (%) | 29 | 60 | 56 | 39 | 96 | 77 | 96 | 82 | 82 |

Configuration types (conf.) are:

1. Tubular.

2. Tubular + empty fixed bed.

3. Immobilised catalyst in fixed bed.

Catalysts are:

A. CaCO3

B. MgO

C. γ-Al2O3

The table lists the conversion rate, which corresponds to the amount of biodiesel in the distilled reaction product after separation of the glycerol fraction.

The table clearly shows higher conversion rates for the invention, although lower reaction times (residence times) were applied.

Need of Pressure/Temperature

The biodiesel was produced in a tubular reactor. The reactor contained the immobilized heterogeneous catalyst and had an empty value of 15 ml. The immobilization was performed using pressed MgO pellets with a diameter of 2 cm and a thickness of 1 cm. Rapeseed oil and preheated methanol were compressed up to the required pressure and pumped in the tubular reactor. A correct mixing of both reactants was assured in the set-up. The mixed streams were heated up to the required temperature in a furnace or oil bath and brought in contact with the immobilized heterogeneous catalyst. After contact, the resulting stream was cooled, depressurized and collected.

To show that a heated and pressurized mixture is needed, following examples are shown and summarised in Table 2. The table also clearly shows that the process can operate below a pressure of 80.9 bar (supercritical pressure of methanol).

Comparative Example 5 (C.5)

The methanol and oil were added to the tubular reactor and the flow rates were adjusted to achieve a residence time of 15 minutes and a methanol-to-oil ratio of 0.6 g/g. The process temperature was 240° C. and pressure was 5 bar.

Invention Example 6 (I.6)

The methanol and oil were added to the tubular reactor and the flow rates were adjusted to achieve a residence time of 15 minutes and a methanol-to-oil ratio of 0.6 g/g. The process temperature was 300° C. and pressure was 5 bar.

Invention Examples 7 (I.7), 8 (I.8) and 9 (I.9)

The methanol and oil were added to the tubular reactor and the flow rates were adjusted to achieve a residence time of 15 minutes and a methanol-to-oil ratio of 0.6 g/g. The process temperature was 300° C. and pressure was respectively 40, 60 and 75 bar (subcritical).

Invention Example 10 (I.10)

The methanol and oil were added to the tubular reactor and the flow rates were adjusted to achieve a residence time of 15 minutes and a methanol-to-oil ratio of 0.6 g/g. The process temperature was 300° C. and pressure was 150 bar.

Invention Example 11 (I.11)

The methanol and oil were added to the tubular reactor and the flow rates were adjusted to achieve a residence time of 10 minutes and a methanol-to-oil ratio of 0.6 g/g. The process temperature was 240° C. and pressure was 150 bar.

Invention Example 12 (I.12)

The methanol and oil were added to the tubular reactor and the flow rates were adjusted to achieve a residence time of 10 minutes and a methanol-to-oil ratio of 0.6 g/g. The process temperature was 280° C. and pressure was 150 bar.

TABLE 2

|  | C.5 | I.6 | I.7 | I.8 | I.9 | I.10 | I.11 | I.12 |
|---|---|---|---|---|---|---|---|---|
| Configuration | Immobilized catalyst in fixed bed | | | | | | | |
| Catalyst | MgO Pellets | | | | | | | |
| Pressure (bar) | 5 | 5 | 40 | 60 | 75 | 150 | 150 | 150 |
| Temp. (° C.) | 240 | 300 | 300 | 300 | 300 | 300 | 240 | 280 |
| MeOH excess (g/g) | 0.6 | | | | | | | |
| Residence time (min) | 15 | 15 | 15 | 15 | 15 | 15 | 10 | 10 |
| Conversion (%) | 0.5 | 59 | 96 | 98 | 96 | 98 | 38 | 80 |

Applicable to Waste Oils/Unrefined Oils

The biodiesel was produced in a tubular reactor. The reactor contained the immobilized heterogeneous catalyst and had an empty value of 15 ml. The immobilization was performed using pressed MgO pellets of a size of 2 cm diameter and 1 cm thickness. The oil and preheated methanol were compressed up to 150 bar and pumped in the tubular reactor. A correct mixing of both reactants was assured in the set-up. The mixed streams were heated up to 300° C. in a furnace or oil bath and brought in contact with the immobilized heterogeneous catalyst. After contact, the resulting stream was cooled, depressurized and collected.

To demonstrate that the process is also applicable to waste streams and unrefined oil, following examples are shown. The results of the experiments are shown in Table 3.

Invention Example 13 (I.13)

The methanol and rape seed oil were added to the tubular reactor and the flow rates were adjusted to achieve a residence time of 15 minutes and a methanol-to-oil ratio of 0.6 g/g. The process temperature was 300° C. and pressure was 150 bar Invention Example 14 (I.14)

The methanol and unrefined rape seed oil were added to the tubular reactor and the flow rates were adjusted to achieve a residence time of 15 minutes and a methanol-to-oil ratio of 0.6 g/g. The process temperature was 300° C. and pressure was 150 bar Invention Example 15 (I.15)

The methanol and waste frying oil were added to the tubular reactor and the flow rates were adjusted to achieve a residence time of 15 minutes and a methanol-to-oil ratio of 0.6 g/g. The process temperature was 300° C. and pressure was 150 bar.

TABLE 3

|  | I.13 | I.14 | I.15 |
|---|---|---|---|
| Oil | Refined rape seed oil | Unrefined rape seed oil | Waste frying oil |
| Catalyst | MgO Pellets | | |
| Pressure (bar) | 150 | | |
| Temperature (° C.) | 300 | | |
| MeOH excess (g/g) | 0.6 | | |
| Residence time (min) | 15 | | |
| Conversion (%) | 98 | 95 | 92 |

Long-Term Processability

The biodiesel was produced in a tubular reactor. The reactor contained the immobilized heterogeneous catalyst and had a total empty value of 15 ml. The immobilization was performed using pressed MgO pellets of a size of 2 cm diameter and 1 cm thickness. The oil and preheated methanol were compressed up to 150 bar and pumped in the tubular reactor. A correct mixing of both reactants was assured in the set-up. The mixed streams were heated up to 300° C. in a furnace or oil bath and brought in contact with the immobilized heterogeneous catalyst. After contact, the resulting stream was cooled, depressurized and collected.

To show that the process is stable, the process was operated with refined rape seed oil for 8 hours at different conditions. At the end of each day the conversion was determined at reference conditions of 310° C., 150 bar and a residence time of 15 minutes. MeOH excess was 0.6 g/g. Catalyst was MgO pellets.

The results are shown in Table 4. In Day 2, two conversions at reference conditions were carried out.

TABLE 4

| Name | Conversion (methylester) (%) |
| --- | --- |
| Day 1 | 100 |
| Day 2-1 | 103 |
| Day 2-2 | 99 |
| Day 3 | 95 |
| Day 4 | 100 |

Ratio Fixed Bed/Empty Reactor Volume

The biodiesel was produced in a tubular reactor. The reactor comprises 3 sections: at the entrance a tubular part without catalyst, a fixed bed containing the immobilized heterogeneous catalyst and at the end again a tubular part without catalyst. The immobilization was performed using pressed MgO pellets of a size of 2 cm diameter and 1 cm thickness. The oil and preheated methanol were compressed up to 150 bar and pumped in the tubular reactor. A correct mixing of both reactants was assured in the set-up. The mixed streams were heated up to 300° C. in a furnace or oil bath and brought in contact with the immobilized heterogeneous catalyst. After contact, the resulting stream was cooled, depressurized and collected.

To show that the process also works with a small fixed bed, the process was operated with different reactor configurations. The volume of the fixed bed was varied with respect of the remaining tubular part of the reactor. The ratio between the volumes of the fixed bed and the remaining of the reactor was varied between 29% and 150%. In this case the volume of the fixed bed was expressed as the empty volume, i.e. the volume of the fixed bed without the presence of catalyst. Results are shown in Table 5.

TABLE 5

| Name | Inv 16 | Inv 17 | Inv 18 |
| --- | --- | --- | --- |
| Ratio fixed bed/remaining reactor (%) | 150 | 59 | 29 |
| Pressure (bar) | | 150 | |
| Temperature (° C.) | | 300 | |
| MeOH-excess (g/g) | | 0.6 | |
| Residence time (min) | | 10 | |
| Conversion (methylester) (%) | 101 | 100 | 101 |

Large Oil-to-Methanol Ratio

The biodiesel was produced in a tubular reactor. The reactor contained the immobilized heterogeneous catalyst and had an empty value of 15 ml. The immobilization was performed using pressed MgO pellets with a diameter of 2 cm and a thickness of 1 cm. Rapeseed oil and preheated methanol were compressed up to the required pressure and pumped in the tubular reactor. A correct mixing of both reactants was assured in the set-up. The mixed streams were heated up to the required temperature in a furnace or oil bath and brought in contact with the immobilized heterogeneous catalyst. After contact, the resulting stream was cooled, depressurized and collected.

To show that the process also works with a small excess of methanol, several examples are shown:

TABLE 6

| | I.19 | I.20 | I.21 |
| --- | --- | --- | --- |
| Catalyst | | MgO Pellets | |
| Pressure (bar) | | 150 | |
| Temperature (° C.) | | 310 | |
| MeOH excess (g/g) | 0.6 | 0.4 | 0.25 |
| MeOH Excess (mole/mole) | 17 | 11 | 7 |
| Residence time (min) | | 15 | |
| Conversion (%) | 98 | 98 | 97 |

Influence of Contact Time

The contact time is defined as (see U.S. Pat. No. 5,908,946) the ratio of the volume of catalyst in the reactor to the volumetric flow rate of the alcohol and the oil or fat (the reactants) applied to the reactor. The ratio has the unit of time and can be regarded as an indication of the time the reactants are in contact with the catalyst.

The relation between residence time and contact time can be derived when one considers that the residence time refers to the ratio of the empty (free) volume of the reactor to the volumetric flow rate of the alcohol and the oil or fat to the reactor. The empty volume of the reactor refers to the volume of the reactor without the catalyst being loaded minus the volume taken by the catalyst.

Hence, the ratio of contact time to residence time equals the ratio of volume of catalyst to empty volume of the reactor. The contact time is typically smaller than the residence time, as the empty volume of the reactor is typically larger than the volume of catalyst.

The volumetric flow rate of the reactants can be calculated from a mass flow rate based on atmospheric conditions.

In invention examples I.6 to I.15 and I.19 to I.21, the ratio between catalyst volume and empty volume of the reactor is 6.1 ml/15 ml=0.4. Hence, the contact times in examples I.6 to I.15 equal the residence time multiplied by 0.4. In examples I.6 to I.10, I.13 to I.15 and I.19 to I.21, the contact time is 6 minutes. In examples I.11 and I.12, the contact time is 4 minutes.

The process of the invention works at short contact times. This is a significant economical advantage for the process, because it allows higher production rates and uses less catalyst with a fixed installation.

Comparative Example 6 (C.6)

In U.S. Pat. No. 5,908,946, a process is described using a heterogeneous catalyst based on ZnO and Al2O3. This process allows the continuous production of biodiesel. However, quite long contact times are needed. At least contact times of more than 40 min are needed to achieve a conversion efficiency of more than 90%. At smaller contact times, i.e. 20 min, only a maximum conversion efficiency of 85% is achieved. An example is given which is obtained at process conditions similar to the examples described in U.S. Pat. No. 5,908,946.

The biodiesel was produced in a tubular reactor. The reactor comprised 15 g of fused MgO catalyst—mesh 4. The catalyst volume was 4.2 ml. The empty volume of the reactor was 16.9 ml. The flow rates were adjusted to have a residence time of 68 minutes, corresponding to a contact time of 17 min. The process conditions, such as temperature, pressure and oil/methanol ratio were taken very similarly to the conditions described in the above patent (see table 4 of U.S. Pat. No. 5,908,946). The process conditions of the present example were as follows: pressure of 50 bar, a temperature of 240° C., and a MeOH-excess of 0.6 g/g, which corresponds to a volumetric oil/alcohol-ratio of 1.4. A conversion efficiency of 98% was achieved.

Invention Example 22 (I.22)

The present example is to prove that the process of the invention works at small contact times, without significant magnesium in the product stream.

The biodiesel was produced in a tubular reactor. Oil and methanol were fed to the tubular reactor. The reactor contained 15 g of fused MgO—mesh 4. The catalyst volume was 4.2 ml. The empty volume of the reactor was 16.9 ml. The flow rates were adjusted to have a residence time of 16 minutes, corresponding to a contact time of 4 minutes. The reaction was performed at 320° C. and 150 bar and a MeOH-excess of 0.6 g/g. The conversion efficiency was 99%+/−3%. In the undestilled product stream, Mg could not be detected, which refers to less than 5 ppm Mg.

Invention Example 23 (I.23)

Biodiesel was produced in a tubular reactor. The reactor contained 81.4 g of dead-burned MgO of mesh 30. The catalyst volume was 23 ml. The empty volume of the reactor was 210 ml. The flow rates of the oil and methanol were adjusted to have a residence time of 20 minutes, corresponding to a contact time of 2 minute. The reaction was performed at 330° C. and 150 bar and a MeOH-excess of 0.61 g/g. The conversion efficiency was 98%+/−4%.

Invention Example 24 (I.24)

Biodiesel was produced in a tubular reactor containing 58.6 g of dead burned MgO of 3-5 mm. The catalyst volume was 16.5 ml. The empty volume of the reactor was 216 ml. The flow rates of the oil and methanol were adjusted to have a residence time of 28 minutes, corresponding to a contact time of 2 minutes. The reaction was performed at 340° C. and 150 bar. The MeOH-excess was 0.6 g/g. The conversion efficiency was 95%+/−4%.

Invention Example 25 (I.25)

The biodiesel was produced by feeding oil and methanol to a tubular reactor containing 58.9 g of dead burned MgO of 0.5-1 mm. The catalyst volume was 16.5 ml. The empty volume of the reactor was 18.2 ml. The flow rates were adjusted to have a residence time of 18 minutes, corresponding to a contact time of 16 minutes. The reaction was performed at 310° C. and 150 bar. The MeOH-excess was 0.6 g/g. The conversion efficiency was 100%+/−3%.

Other MgO-Containing Catalysts

Invention Example 26 (I.26)

The biodiesel was produced in a tubular reactor. The reactor contained immobilized MgO—$Al_2O_3$—$ZrO_2$ catalyst (99% purity) and had an empty volume of 15 ml. The reactor was loaded with 10 g of sintered lumps of 1-3 mm. The catalyst had a volume of 2.8 ml. The empty volume of the reactor was 18.3 ml. The oil and preheated methanol were compressed up to 150 bar and pumped in the tubular reactor. The flow rates were adjusted to achieve a residence time of 18 minutes and a MeOH-excess of 0.6 g/g. A correct mixing of both reactants was assured in the set-up. The mixed streams were heated up to 340° C. in a furnace or oil bath and brought in contact with the immobilized heterogeneous catalyst. After contact, the resulting stream was cooled, depressurized and collected.

The contact time amounted 2.8 minutes. The conversion was 98%+/−3%.

Invention Example 27 (I.27)

The fixed bed was filled with immobilized fused $Al_2MgO_4$ with a particle size of 1-3 mm. The catalyst weighed 9.3 g and had a volume of 2.6 ml. The empty volume of the reactor was 18.5 ml. The flow rates were adjusted to achieve a residence time of 19 minutes and a MeOH-excess of 0.6 g/g. The contact time amounted 2.6 min. The reaction was performed at 150 bar and 320° C. The conversion efficiency amounted 97%+/−3%.

The invention claimed is:

1. A method of producing a fatty acid alkylester, comprising transesterification of triglycerides contained in a fat or oil and an alcohol, wherein:
   the transesterification reaction is catalysed by a heterogeneous catalyst immobilised in a tubular reactor, wherein the catalyst comprises a metal oxide, the metal oxide comprising an alkaline earth metal,
   temperature is between 260° C. and 420° C.,
   pressure is at least 40 bar, and
   a mixture of said fat or oil and said alcohol is led in a continuous flow through said tubular reactor.

2. The method according to claim 1, wherein the metal oxide comprises Mg.

3. The method according to claim 1, wherein the catalyst comprises MgO.

4. The method according to claim 1, wherein the residence time of said mixture in the tubular reactor falls in the range between 1 minute and 100 minutes.

5. The method according to claim 1, wherein the residence time of said mixture in the tubular reactor falls in the range between 1 minute and 45 minutes.

6. The method according to claim 1, wherein the residence time of said mixture in the tubular reactor falls in the range between 5 minutes and 15 minutes.

7. The method according to claim 1, wherein the contact time of said mixture with said catalyst is lower than 40 minutes and higher than or equal to 1 minute.

8. The method according to claim 1, wherein the contact time of said mixture with said catalyst is lower than 20 minutes and higher than or equal to 1 minute.

9. The method according to claim 1, wherein the contact time of said mixture with said catalyst falls in the range between 2 minutes and 8 minutes.

10. The method according to claim 1, wherein the alcohol is methanol.

11. The method as in claim 1, wherein the catalyst is immobilised in a fixed bed, as pellets, as a coating or in a porous structure.

12. The method as in claim 1, wherein the pressure is lower than 80.9 bar.

13. The method as in claim 1, wherein the pressure is between 40 and 400 bar.

14. The method as in claim 1, wherein the ratio of alcohol versus fat or oil is lower than 30 mole/mole.

15. The method as in claim 1, wherein the fat or oil is selected from the group consisting of: refined fat, refined oil, unrefined fat, unrefined oil, refined waste fat, refined waste oil, unrefined waste fat, and unrefined waste oil.

16. The method of claim 1, wherein the pressure is between 40 and 80 bar.

17. The method according to claim 3, wherein the catalyst consists of MgO.

18. A method of producing a fatty acid alkylester, comprising transesterifying triglycerides contained in a fat or oil with an alcohol, wherein:

the transesterification reaction is catalyzed by a heterogeneous catalyst immobilized in a tubular reactor, wherein the catalyst comprises an oxide of an alkaline earth metal;

temperature is between 260° C. and 420° C.;

pressure is at least 40 bar; and a mixture of said fat or oil and said alcohol is led in a continuous flow through said tubular reactor.

19. The method of claim 18, wherein the alkaline earth metal is magnesium.

* * * * *